United States Patent [19]

Davey

[11] Patent Number: 4,704,152
[45] Date of Patent: Nov. 3, 1987

[54] METHOD OF AND APPARATUS FOR PRESS FORMING CATHODE RAY TUBE FACEPLATE PANELS

[75] Inventor: Donald G. Davey, Dublin, Ohio

[73] Assignee: Owens-Illinois, Inc., Toledo, Ohio

[21] Appl. No.: 891,452

[22] Filed: Jul. 28, 1986

[51] Int. Cl.⁴ .............................................. C03B 11/02
[52] U.S. Cl. .......................................... 65/29; 65/68; 65/163; 65/164; 65/308
[58] Field of Search ...................... 65/29, 68, 163, 164, 65/308

[56] References Cited

U.S. PATENT DOCUMENTS 3,362,807  1/1968  Wiley ..................................... 65/308
3,787,196  1/1974  Becker et al. .......................... 65/164
4,554,001  11/1985  Shields et al. .......................... 65/308

Primary Examiner—Arthur Kellogg
Attorney, Agent, or Firm—H. G. Bruss

[57]  ABSTRACT

A cathode ray tube faceplate press having an indexing table rotatable around a column normal to the table and having circular array of female molds concentric with the column. Index speed of the table is optimized by a barrel cam drive cut to provide smooth acceleration and deceleration which can be tolerated by the molten glass in the molds. A cam dwell precisely registers the table work stations avoiding the need for register pins and the delays they introduce. Acceleration and deceleration peak at about the one-eighth and seven-eighths position of the drive cycle following a generally sinusodial form.

17 Claims, 12 Drawing Figures

METHOD OF AND APPARATUS FOR PRESS FORMING CATHODE RAY TUBE FACEPLATE PANELS

This invention relates to glass forming apparatus and methods and more particularly to methods of and apparatus for pressing glass cathode ray tube faceplate panels.

Heretofore it has been known to press glass panels for cathode ray tube faceplates on an indexing table having an annular array of female molds which can be advanced step-by-step to a series of work stations. A molten glass feeder deposits a gob of molten glass in a mold cavity at a feeder station and that cavity with the gob is advanced by rotary indexing of the table to a pressing station in which a male mold is advanced into the female mold to form the faceplate. Subsequent table advancement steps carry the glass and mold through initial cooling stations, a mold shell transfer station and further cooling stations to a takeout station. The indexing table is arranged to accommodate a number of different mold sets for a substantial range of sizes of faceplates and typically is of the order of twelve feet in diameter and of heavy construction to accommodate the forces imposed in the forming operation. The great masses of machinery and the precision with which parts must be positioned have place constraints on the speed of the apparatus and particularly the speed of the indexing cycle of the table.

Television faceplates require high optical quality as well as precise sizing. The glass gob delivered at the feeder station should be maintained in its receiving mold in a position to be properly distributed within the mold as it is pressed in the pressing station. The soft glass form advanced from the pressing station to the cooling stations should not be distorted during that advance. Thus it is desirable to index the table carrying the molds and glass through a motion which does not result in undesired displacement of the unformed or formed and fluid glass. The motion should minimize vibration and shock and should position each mold in its station with precision so that, for example, the plunger driven male mole element enters the female mold centered to form the inner surface of the faceplate with appropriate viewing surface and skirt contours and thicknesses. As a result of these motion and position constraints, the operation of indexing tables of faceplate presses have been slow and have involved motion patterns which are far from optimum since they involve velocity, acceleration and jerk values at certain portions of the cycles which subject the molten glass to forces near tolerable limits.

Prior art indexing tables for cathode ray tube faceplates have been driven by hydraulic or pneumatic rams augmented by shock absorbing mechanisms or snubbers which imposed abrupt changes in the indexing motion and were the limiting factors in the operating speed of the pressing apparatus. Further, such drives were not readily controlled as to their position at the end of each stroke and employed indexing pins which were advanced into suitable apertures to bring the table to a precise registering orientation with the associated work stations such as the ram driven male mold and maintain that orientation. Since index pin advancement is required prior to initiation of the pressing functions in order to establish the relative orientation of parts, a further delay was introduced in each press index cycle.

One approach previously employed in indexing a faceplate pressing table was to employ three hydraulic drives synchronized hydraulically. This only partially eliminated the problem of backlash and continued to require index pin final positioning. It did not increase indexing speed to approach a cycle time limited by heat extraction for the glass parts nor did it smooth cycle motion whereby improved ware quality could be achieved. Further, it did not offer the desired symmetrical acceleration and deceleration on indexing and the optimum minimizing of distortion forces on the molten glass at high production rates.

The present invention has as its objects the improvement of faceplate quality, increase in production speed and reduction in product costs. Further objects include reduction of indexing time without adverse effects upon the ware being produced, increased control of the entire indexing motion, and avoidance of malfunctions due to undertravel or overtravel of the indexed table. In addition, the consistency of operation is improved and the need for complex acceleration and deceleration mechanisms are eliminated.

These objects are achieved by a drive which indexes the table on which faceplates are pressed with a symmetrical acceleration and velocity as plotted against drive mechanism displacement and tolerable levels of jerk at the inflection points for acceleration. The drive employs a double lead barrel cam which provides the high torque and positive control of table position throughout the indexing cycle. In the illustrative embodiment an eleven station, dual revolution press cycle is utilized wherein the table is indexed two elevenths or 65.45° in each step.

Drive of the table is by means of a continuously operating motor and flywheel coupled through a clutch/brake to a worm driving a worm wheel on the shaft for the barrel cam. An acceleration vs. rotational displacement of the barrel cam can be made to approach a sine wave cycle wherein clutch application accelerates the barrel cam during a cam dwell preceding the beginning of an indexing operation and brake application decelerates the barrel cam during a cam dwell immediately following the end of the indexing operation. The table driving barrel cam is cut to achieve maximum table rotational velocity and to initiate deceleration at about 150° into its 300° of cam rotation which provides the driving force for the indexing function. Cam dwell occurs at the indexed position of the table thereby precisely positioning the table with its work stations precisely oriented in the cooperating stationary processing stations. This has enabled the register pins to be eliminated from the press table and thereby eliminated the additional time of insertion and/or withdrawal of those pins. A typical prior art press table, in addition to imposing unwanted accelerations during indexing which required a longer indexing interval, had that interval further extended by register pin operation. Since tool operations could not be initiated until pin insertion, the index interval was about 2 seconds as compared with an interval of about one second with the apparatus of this invention. Improved quality product, a more consistent product and an increase in operating speed have been achieved.

The above objects and features together with others will be more fully understood from the following detailed description when read with reference to the accompanying drawings in which.

Cathode ray tube faceplates, particularly those to be employed as television picture tube faceplates require large glass areas free of visible defects. These faceplates must be of substantial thickness, of the order of one-half inch, in order to withstand the atmospheric pressure imposed upon the evacuated tubes in which they are incorporated. Dimensional stability is also essential in order that the interior surface of the faceplate is not displaced with respect to the shadow mask to change the Q distance of color cathode ray tubes during assembly, evacuation, and use.

These quality demands must be achieved uniformly for large numbers of faceplates manufactured in high speed operations wherein molten glass gobs are deposited in a female mold cavity and are pressed to precise dimensions within that cavity by a male mold driven into the cavity by a ram. Important considerations with regard to the forming of the faceplates is the distribution of the glass of the gob as it is introduced into the female mold and prior to the pressing of the ram driven male mold, the relative positions of the male and female mold during pressing, the stresses imposed on the molten glass prior to, during and after pressing and the heat extraction from the faceplates which is accomplished during the forming.

Heretofore faceplates have been pressed in a multistation apparatus arranged as a circular indexing table carrying a plurality of female molds and having processing stations which register various workpiece forming elements with the female molds at the several indexed positions of the table. Such apparatus is large and of great mass requiring high torque to perform the indexing of the table and the equipment and worked elements it carries. For example, a table capable of forming twenty-seven inch television picture tube faceplates in an eleven station process involving two table revolutions requires torque in excess of a million inch pounds at acceptable forming speeds. One approach to indexing tables of this form of faceplate press has been to employ an index shaft having a rotating arm which engages a dog with teeth on the shaft and is driven by a reciprocating hydraulic cylinder. In order to achieve acceptable index cycle times, a hydraulic booster has been employed on the drive index cylinder to increase the acceleration at the start of the cycle. A cushion is provided in the drive linkage to reduce shocks in the system. Velocity and acceleration curves are shown in FIGS. 1 and 2 for a system as described.

Figure 1:
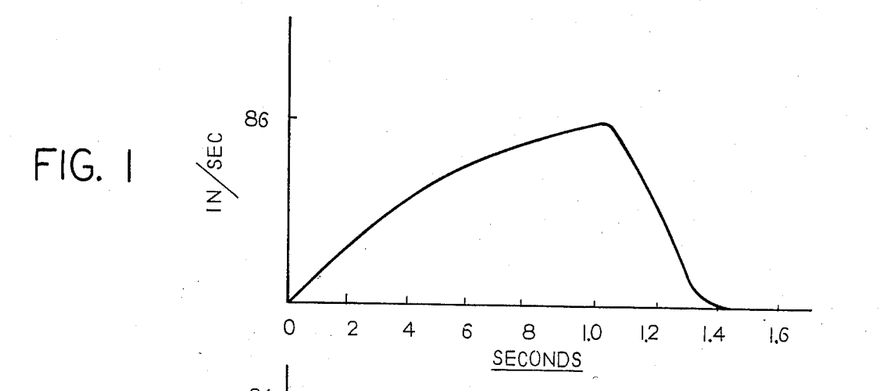
FIG. 1 is a plot of a velocity vs. time curve for a faceplate pressing table index of the prior art applied to a driven apparatus of the general size and form of the driven apparatus of this invention.
Figure 2:
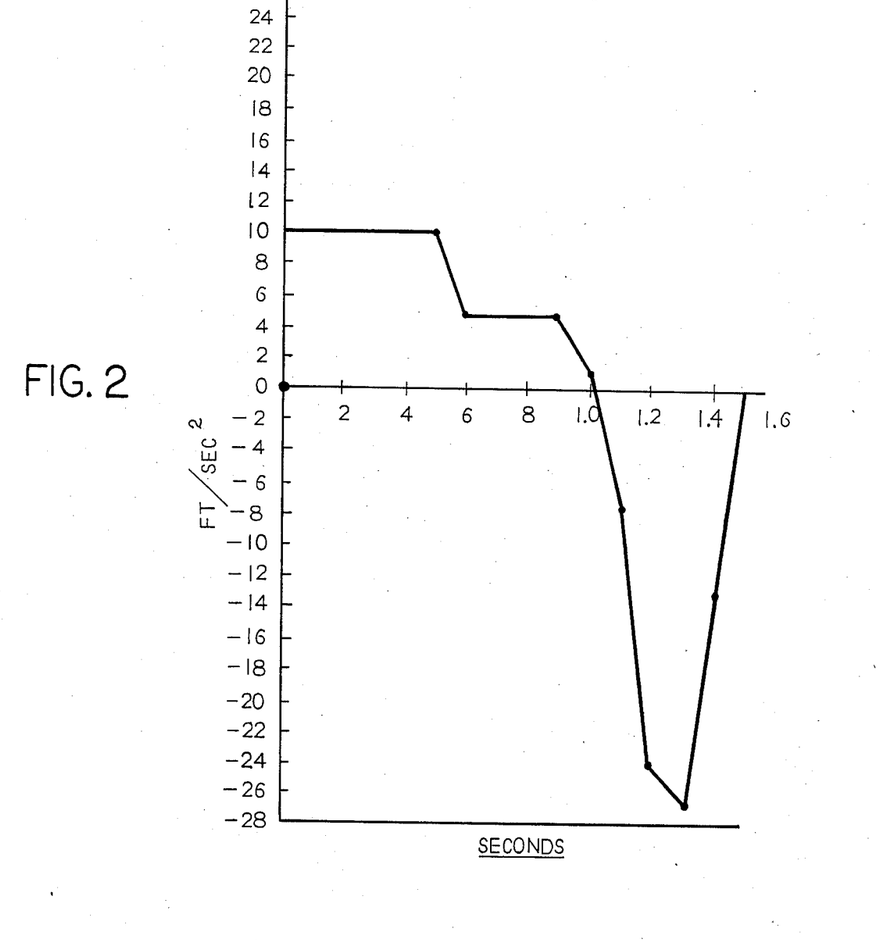
FIG. 2 is a plot of an acceleration vs. time curve for the prior art as shown in FIG. 1.

It is evident from FIGS. 1 and 2 that the indexing table is subjected to abrupt changes in velocity. Further the required index cycle time is greater than desired. Both of these effects have undesirable forming consequences. The velocity changes influence the molten glass distribution particularly at the transfer of the glass gob to the pressing station and the transfer of the pressed faceplate to the cooling station. The excessive index cycle time, imposed by acceleration and shock limitations permits the glass to cool longer than is optimum for most efficient faceplate pressing. In an eleven station pressing apparatus the eleven indexes for pressing typically consumed 22 seconds of a total 77 second cycle.

Figure 3:
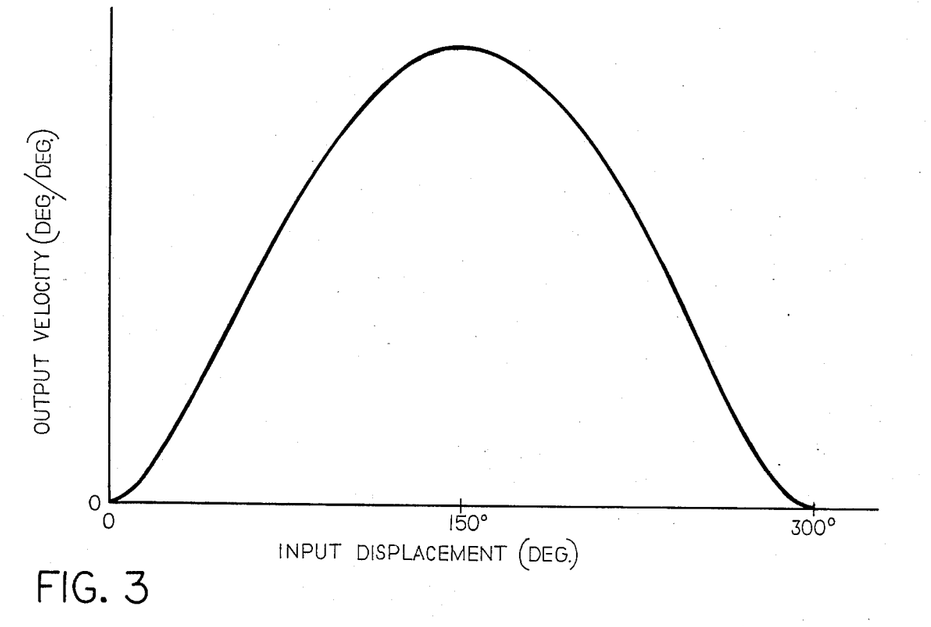
FIG. 3 is a plot of velocity vs. time curve for a faceplate pressing table index having the drive mechanism of the present invention.
Figure 4:
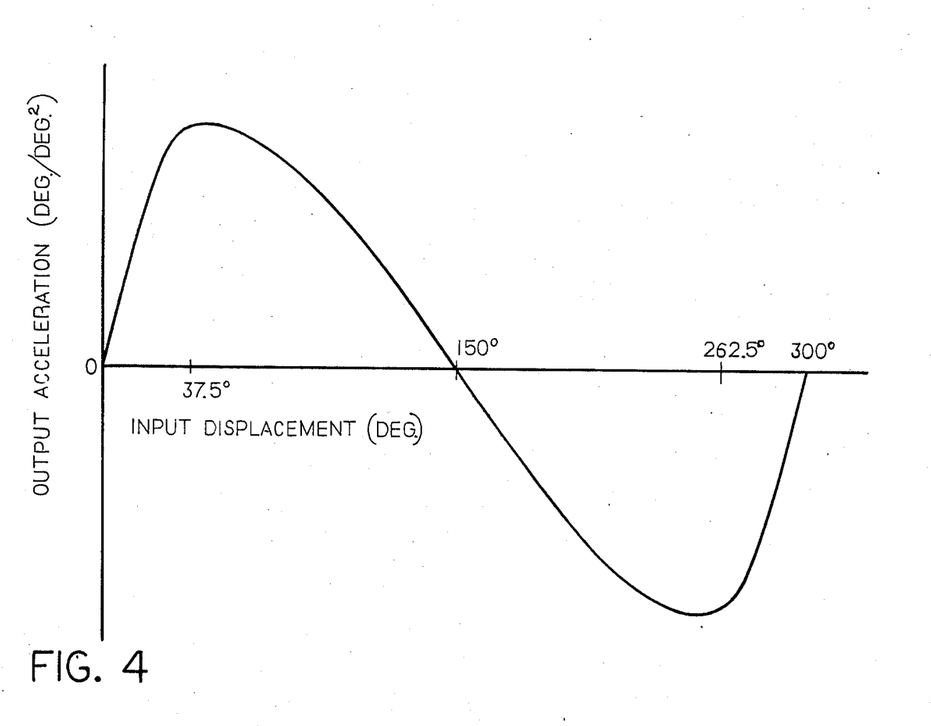
FIG. 4 is a plot of an acceleration vs. time curve for the apparatus of this invention.
Figure 5:
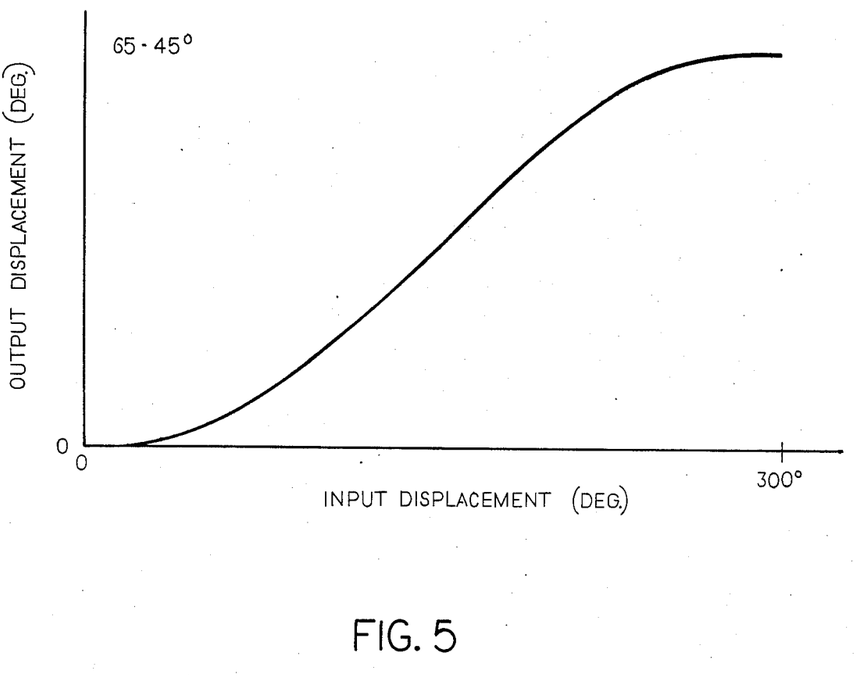
FIG. 5 is a plot of a displacement vs. time curve for the apparatus of this invention.

FIGS. 3, 4 and 5 are plotted on a comparable time scale to that employed for FIGS. 1 and 2 to illustrate the improved velocity and acceleration and the smooth displacement achieved with the combination of the present invention. Typically the tool functions at the various stations around the table are completed in about five seconds. Transfer of work pieces to the next station involves an advance of 62.5° around the axis of rotation of the table. In the present invention an eleven station pressing cycle is reduced to about 66 seconds of which 11 seconds is the cumulative indexing time. Table velocity in FIG. 3 is plotted as the ordinate in degrees of table rotation per degree of driving cam rotation and the abscissa is input displacement in degrees of driving cam rotation. The plot of FIG. 3 also represents degrees of table rotation per unit of time where, as in the present example, the driving cam rotates at a constant velocity during the driving portion of its cycle of rotation. As will be explained in greater detail, an index of the table through 65.45° is accomplished in one revolution of the driving barrel cam and the velocity, acceleration and displacement as shown in FIGS. 3, 4 and 5 is established by the shape of the driving surfaces of the cam. In the present system a double lead cam is employed in view of the magnitude of drive torque. Cam ribs are cut so that followers embrace both sides of the rib to avoid backlash and provide precise positional control of the table. The ribs provide a dwell through a portion of the cam revolution so that the acceleration and deceleration of the cam in its intermittent indexing drive is accomplished before the table load is picked up. Typically the dwell is through 60° of cam rotation and in the plots of FIGS. 3, 4 and 5 the driving sections of the cam ribs are through 300° of cam rotation. Thus while the plots are shown for rotation from zero degrees through 300°, in the discussion which follows rotational position of the barrel cam is considered to be the beginning of the dwell. Normally cam motion is stopped at and started from the center of the dwell or at the 30° position of the cam allocating 30° of dwell for the deceleration to a stop and 30° of dwell for acceleration to driving speed in a start.

FIG. 4 illustrates the acceleration of the table plotted as degrees of table rotation per degrees$^2$ of cam rotation translatable to degrees of table rotation per second$^2$ against degrees of cam rotation or time for constant rotational speed of the cam. The pattern of acceleration approaches a single cycle sine wave over the driving interval of the cam with the peaks skewed from the quarter interval locations, 75° and 225° on a 300° driving cycle, toward the one eighth cycle position of 37.5° and 262.5° or the beginning and terminal portions of the cycle. With the illustrated pattern, a cam rotation of 65 r.p.m. can be tolerated by the molten glass to produce high quality ware consistently.

FIG. 5 shows table rotational displacement against cam displacement over an index cycle wherein the table is shifted 65.45° in 300° of cam rotation accomplished in 0.769 seconds.

As will be described, the table is driven by means of a motor which runs continuously to drive a flywheel which is coupled selectively to a barrel cam indexing drive for the table. The selective coupling is by means of a clutch which initiates cam rotation and brings the cam up to rotational speed prior to its pick up of the table load to be driven. At the end of the indexing cycle the cam returns to an unloaded state and is then brought to a stop by a selectively applied brake. Each indexing cycle of the table requires one revolution of the cam. Thus, time in FIGS. 3, 4 and 5 can be equated to cam rotation over the driving portion of cam rotation, 300° in the example and the braking to a stop and clutch engagement to bring the cam to speed are accomplished through a cam dwell interval which is 60° in the example divided evenly so that 30° are allocated to the stopping functions and 30° are allocated to the starting functions.

Figure 6:
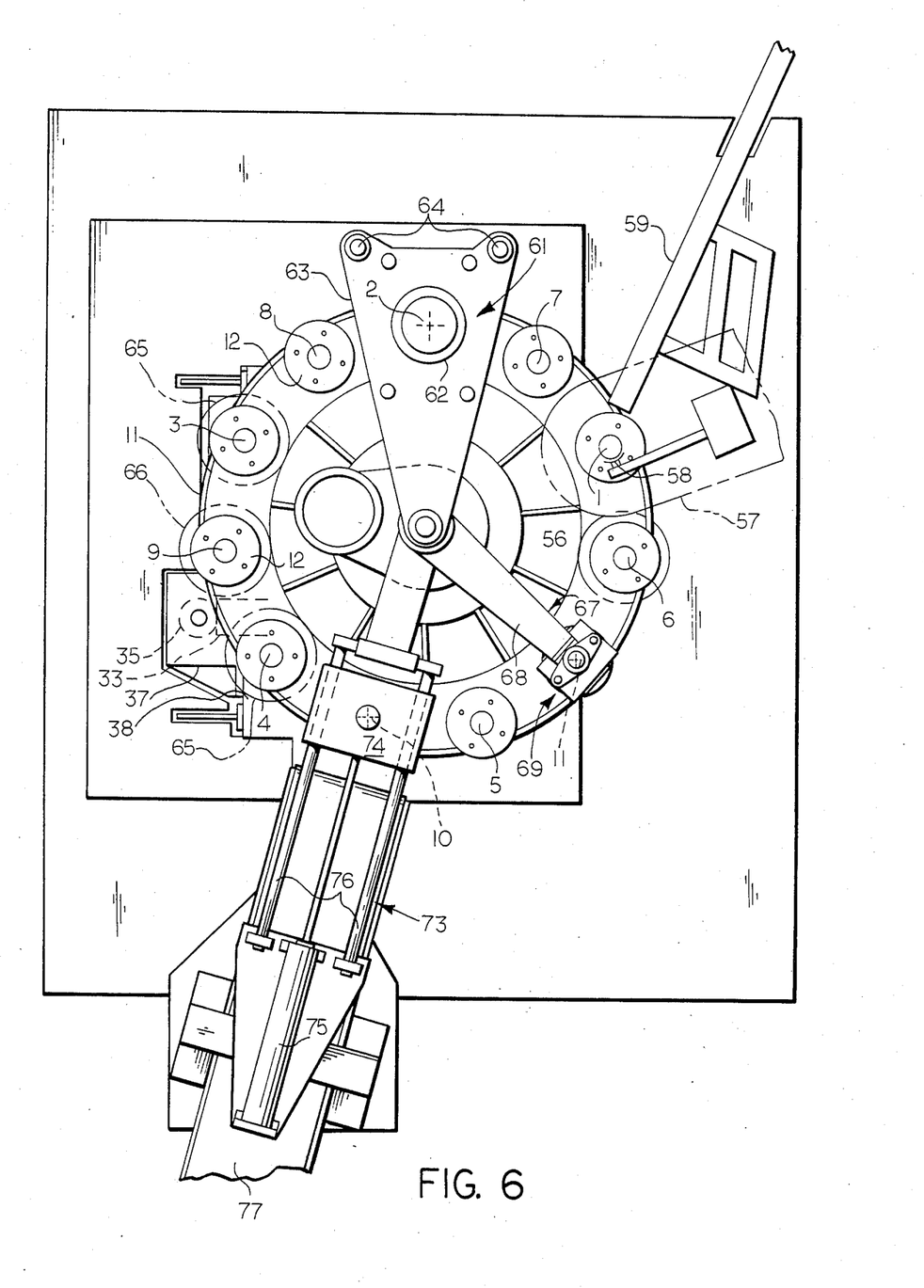
FIG. 6 is a plan view of a faceplate press according to this invention with some of the auxiliary equipment omitted.

In the present apparatus the indexing table as shown in FIG. 6 is driven by a barrel cam which maintains positive control of the table position throughout the index cycle. As a result, acceleration forces on the glass are smooth, that is jerk is minimized and the index cycle time can be reduced without imposing undue stresses on the fluid glass.

Figure 12:
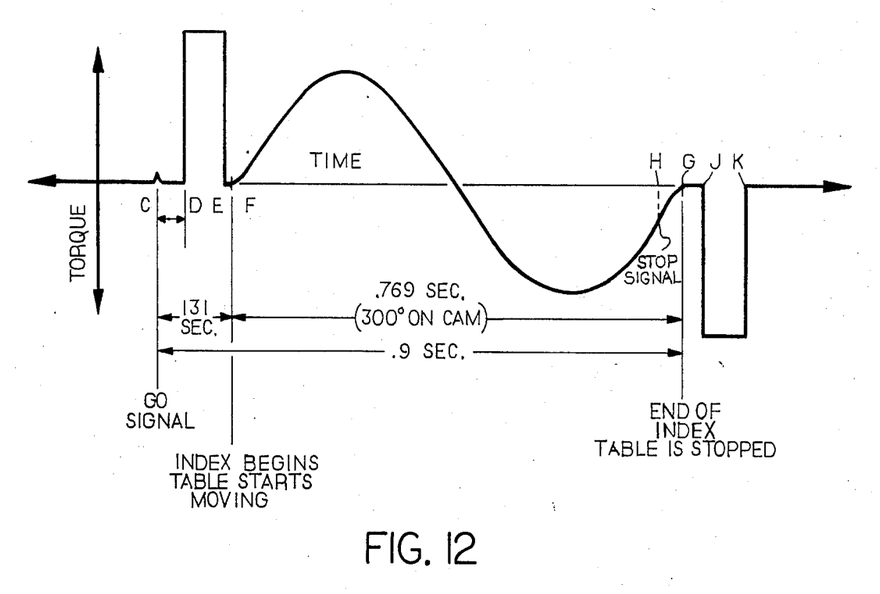
FIG. 12 is a plot of torque vs. time for the indexing drive utilized with the apparatus of FIG. 6.

Jerk, acceleration, velocity and displacement are directly related to cam rotation in the barrel cam drive disclosed since the double track cam is continuously coupled to the table by paired followers. An indexing cycle torque curve plotted against time is shown in FIG. 12 as the means of establishing and maintaining an essentially uniform cam speed during the driving interval of its cycle. The cam is formed to have a sixty degree dwell and a three hundred degree drive to provide a single rotation index cycle.

An index cycle as shown in FIG. 12 is initiated with the barrel cam stationary and the table which it drives positioned so that each of its operative stations is precisely in registry with the processing stations arrayed around its periphery. The index cycle begins after the tooling at the processing stations, which is retractable, has been withdrawn from the table. A continuously running motor drives a flywheel which can be coupled to the barrel cam by a clutch which is hydraulically actuated. Thus from a "go signal" at the beginning of the cycle and while the cam engages the table drive followers in its dwell region there is a delay of valve response time C-D to clutch engagement at time D. Full dynamic torque is applied through the clutch until the cam is accelerated up to its operating speed at time E and engages its driven section at time F, sixty-five revolutions per minute in the example of a index cycle time of about 0.8 seconds. Cam acceleration occurs through the dwell, about thirty degrees of cam rotation. Torque follows an essentially single cycle sine form during about three hundred degrees of cam rotation over the interval F-G, the index drive portion of its rotation, and during the dwell portion a hydraulically actuated braking function is imposed over the interval J-K to bring the cam to a stop with the table stations in registry with the next processing stations. A delay is experienced in valve response time from the stop signal to release of the drive clutch and application of the brake. This delay can occur between the end of drive torque application and brake application over interval G-J. However, it has been found that the delay of the response to the actuation of the stop signal can be shifted into the terminal portion of the cam drive, for example, in the last 15° of rotation and over an interval H-J which is adjustable to adjust the position along the dwell at which the cam is stopped. During brake application, full dynamic torque is imposed until the barrel cam is decelerated in its rotation to a stop.

The general layout of the faceplate press is shown in FIGS. 6 through 10 wherein the indexed work table 11 is a large diameter, e.g., ten feet, casting containing eleven equally spaced pockets 12 for mounting female molds (not shown). The machine is mounted on a fabricated base 15 from the top of which extends a stationary column 14. A hub 16 concentric with column 14 supports table 11 and is arranged with roller bearings 17 at its top and bottom for rotational support of the hub and table from the base 15 and shaft 14. A roller gear hub 18 is mounted on the table hub 16 and within the base 15. Radially mounted, equally spaced cam followers 19 extend from the hub periphery to engage cam surfaces 21 and 22 forming the sides of tapered ribs 23 on barrel cam 24 carried on a shaft 25 mounted in the base 15 with its longitudinal axis in a plane normal to the table hub and normal to a radius extending from the axis of rotation of that hub. At least two followers 19 engage the tapered rib 23 of the barrel cam at all times and the cam is cut with a varying helix angle which is straight for sixty degrees of rotation and curved with a double thread for three hundred degrees such that before one roller is driven to exit the cam and approaches disengagement with the cam rib, a second following roller has engaged the cam rib and is entering a thread to cooperate with the first following roller in embracing the rib.

The barrel cam 24 is cut to provide a velocity, acceleration and displacement of the table 11 through its indexing arc of 65.45° for 300° of revolution of the cam around its shaft 25 as shown in FIGS. 3, 4 and 5 respectively for a constant rotational speed such that angular rotation can be equated to time. As the barrel cam 24 is rotated in the start of an index cycle, the hub 16 and the table 11 remain stationary while the roller followers 19 ride the straight portion of the rib 23. When the cam is rotated to bring the portion of the rib which is inclined to the axis of the cam into engagement with the rollers 19 the table rotates according to the displacement pattern of FIG. 5. After one complete cam revolution, two rollers have been passed through the cam and the table has moved two elevenths of a revolution or 65.45°. Two rollers are engaged with the tapered cam rib at all times to retain positioned control of the table.

Five and one-half indexes are required to rotate the table one revolution, that is, the table is advanced through a faceplate pressing cycle by eleven index cycles causing it to make two complete revolutions. A mold station is carried through two revolutions to return it to its initial forming station.

The cam 24 is secured to a shaft 25 mounted in the table base 15 by tapered roller bearings 26 and 27. It's axis of rotation lies in the plane of the followers 19 mounted on the roller gear hub 18 secured to the indexing table hub 16. Eleven followers 19 in the form of rollers extend radially from hub 18, each in the radial plane from the axis of rotation of table 11 containing the centerline of mold pockets 12 in table 11. Cap screws 31 pass through a flange 32 on the shaft 25 and into tapered holes in the body of the cam. Shaft 25 is driven by a worm and gear set including a gear 33 bolted to a flange 34 welded to the shaft and engaged by a worm 35 on a drive shaft 36 having its axis of rotation parallel to the axis of rotation of the table 11. Each end of drive shaft 36 extends beyond a worm housing 37 attached to cam housing 38 of base 15. The upper end is connected through a hydraulic clutch 39, to an auxiliary drive 41, a reversible motor for positioning the table during setup. The lower end is coupled to the power unit 42, best seen in FIGS. 8 and 11, driving the table 11 through a double flexible disc type, zero backlash coupling 43.

Figure 11:
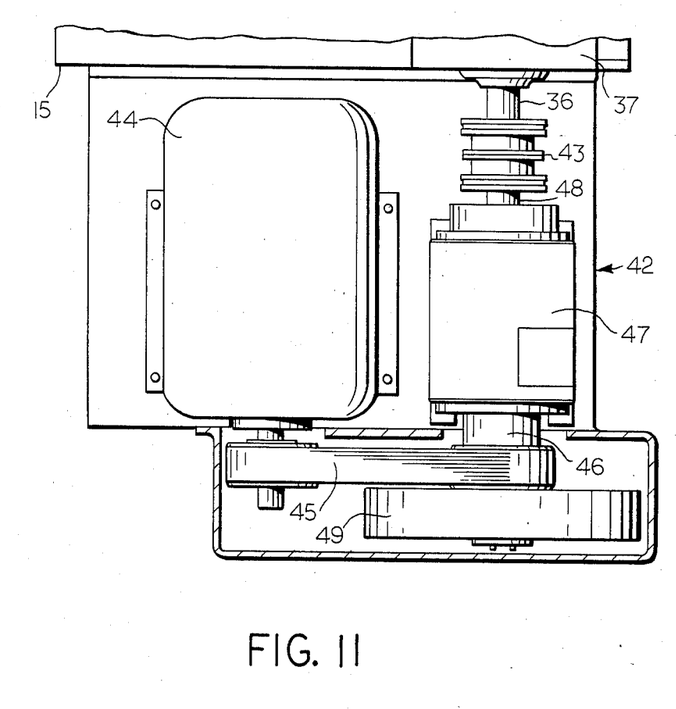
FIG. 11 is an enlarged elevational view of the table drive motor, and associated elements coupled to the cam drive.

The power unit 42 consists of an electric motor 44 mounted on the press base 15 and coupled through a toothed belt drive 45 to the input shaft 46 of a clutch/brake 47 having its output shaft 48 coupled through the coupling 43 to the worm shaft 36. The input shaft 46 of the clutch/brake carries a flywheel 49 which serves to store the engergy required to accelerate the worm, worm wheel, barrel cam, table and the table supported elements to full speed when the clutch is engaged.

The clutch/brake unit is a multiple disc type operating in oil and actuated by hydraulic pressure. The oil is circulated through a water-cooled heat exchanger (not shown) to dissipate the heat generated by the clutching and braking actions.

Figure 9:
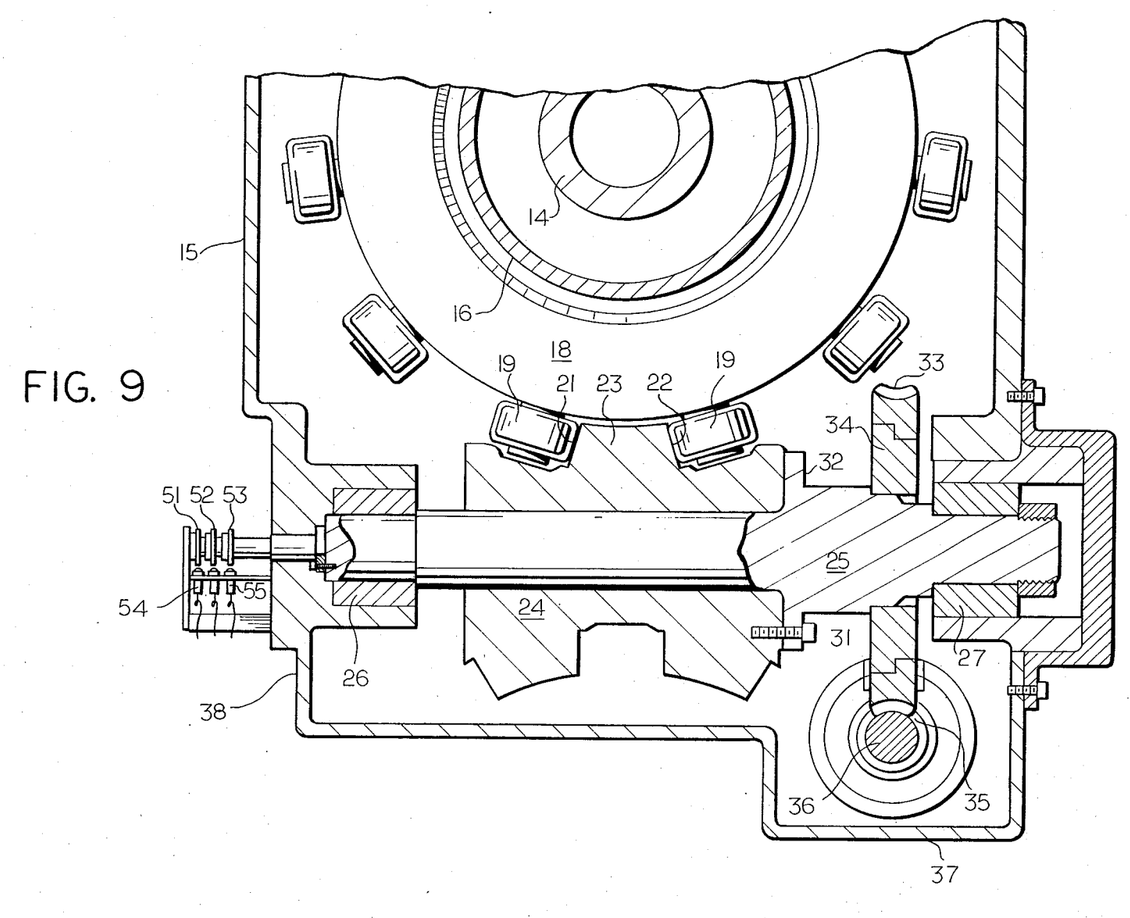
FIG. 9 is a broken away plan view of a portion of the press table of this invention showing in partial section the drive for the table including follower hub, followers, barrel cam and its drive, with portions omitted.
Figure 10:
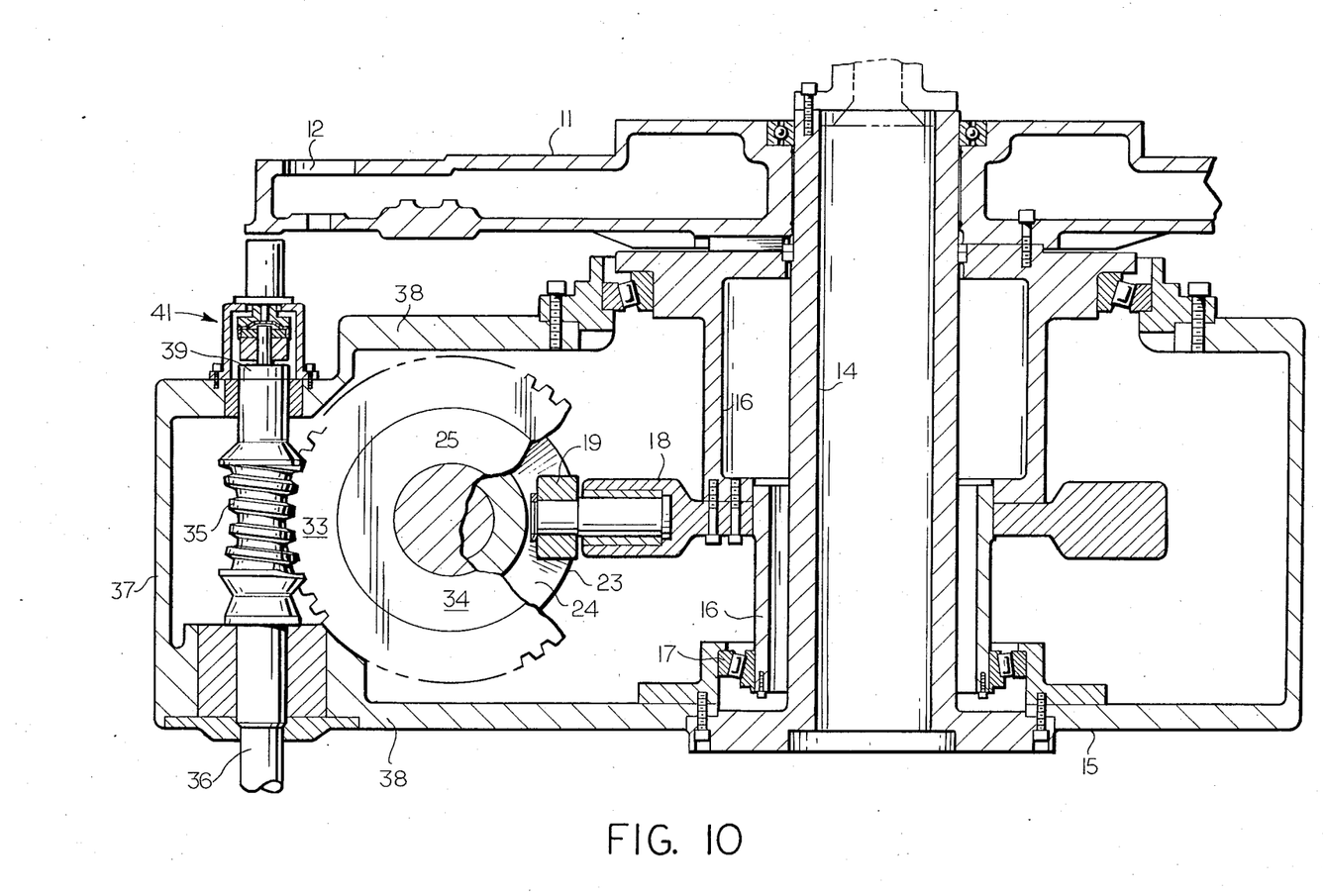
FIG. 10 is an end elevational view of the press table partially sectioned to show the cam and follower and portions of the cam drive relationship to each other and the press table base with portions omitted.

Control of the table is coordinated with the remainder of the press functions through proximity switches, shown in FIG. 9. An extension of the cam shaft 25 carries cams 51, 52 and 53 to signal the application of brake 47 and thus release of the clutch, and the cam position in its dwell state, and the cam position in an overtravel state. Brake cam 51 is adjustable so that it can be set to signal the clutch/brake to stop the cam shaft rotation in the center of the cam dwell. Cam dwell indicator cam 52 is keyed to the cam shaft and is not adjustable, since it indicates that the drive cam is in its dwell position, i.e., from the 0° position to the 60° position of shaft 25 and cam 24. The safety overtravel interlock cam 53 is also keyed to the shaft to indicate that the drive cam has traveled beyond the cycle start position, i.e., from the 50° position to the 110° position, when such overtravel occurs. When the cam and table overtravels, they can be inched to their start position by the auxiliary drive 41 which can be driven in either forward or reverse direction.

The table must be in the dwell position with the molds centered at their stations prior to the start of an index. Half the dwell is utilized to stop the cam after the table is centered at its stations, and half to start it before the table drive motion is begun. A torque vs. cam rotation or time plot for the index of the table is shown in FIG. 12. The overall apparatus has an operating cycle time of five seconds and an indexing time of 5.977 seconds broken down as a cycle start with the molds centered at their stations and the tool functions at the stations initiated. At the end of five seconds, all tool functions are complete and this triggers the start of an index by energizing the solenoid valve which controls the clutch to apply hydraulic pressure to the clutch and initiate its engagement. This consumes 0.054 seconds. The clutch is engaged to deliver full dynamic torque to the worm, its gear, the drive cam and its shaft to accelerate these elements to operating speed of 65 r.p.m. in the example in an additional 0.077 second or 30° of drive cam shaft rotation so that after 0.131 seconds from index cycle start the table begins its indexing transfer. The table transfer is complete after an additional 300° of drive cam shaft rotation or 0.769 seconds and the elapsed time of tool operation and table transfer is completed in 5.900 seconds. At this point the brake control switch is actuated so that the clutch is released and hydraulic pressure is applied to the brake to stop the cam in 30° of rotation or 0.077 seconds after the brake actuation for a total cycle time of 5.977. At 6.000 seconds from cycle start, the tooling at all stations begin their operation and start a new cycle. A start time (not shown) is triggered by a signal from the dwell proximity switch 54 unless it is inhibited by the overtravel proximity switch 55. Once the start timer is timed out the overtravel proximity switch 55 is disabled so that the cam can be driven through its index cycle.

In the event the shaft rotates beyond its stop position, safty interlock overtravel cam actuates its switch and a dump valve is de-energized to remove hydraulic pressure from the clutch/brake 41 and to put the press in a neutral condition with the power to the indexing motor 44 cut off and the tooling either interlocked to prevent its functioning or signaled to return to a safe position and a brake (not shown) is applied to the flywheel to stop the unit.

Timing control for the apparatus can be provided by a rotating cam limit switch timer (not shown) which provides electrical signals required to actuate the various functions of the press tooling and table indexing. A feeder and sheer mechanism (not shown) issues gobs to a mold (not shown) at station #1 from a feeder bowl 56 as controlled by a feeder timer (not shown) which is coupled to the rotating cam limit switch timer with suitable machine-feeder phase control by means not shown.

The tooling functions of the press involve the issuance of a gob of molten glass from feeder bowl 56 to a mold at station #1, the pressing of a gob delivered in the preceding press cycle when it has been indexed with its mold station #2, the cooling of the pressed faceplate by lowering a retractable wind header over the gob and its mold shell at stations #3 and #4, the removal of the mold shell from the pressed and partially cooled faceplate at station #5 and its transfer to station #11, the cooling of a face-plate which had its mold shell removed in the preceding cycle at station #6, the open-to-ambient cooling of the faceplates at stations #7 and #8, the positioning of a faceplate under a stationary wind header at station #9, the removal of a relatively cool faceplate at takeout station #10 and the placement of a mold shell removed from station #5 at station #11 to prepare for the reception of a molten gob as it is next indexed to a position in station #1. Thus the gob admitted at station #1 from the feeder bowl at the end of forehearth 57 is successively advanced with intermittent indexes through ten of the eleven stations over an interval of sixty seconds.

Figure 7:
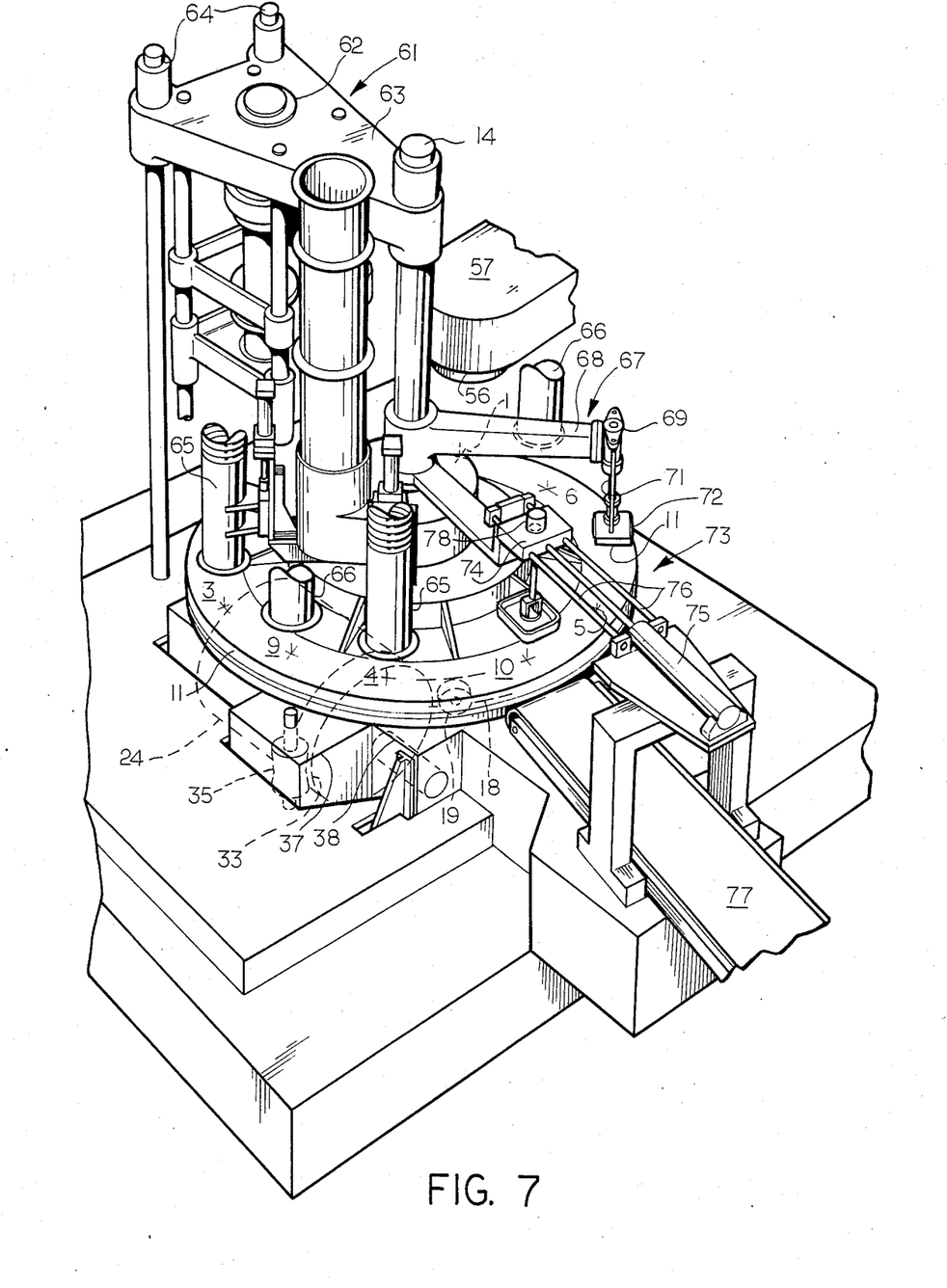
FIG. 7 is a perspective view of the faceplate press according to FIG. 6 in somewhat simplified schematic form.
Figure 8:
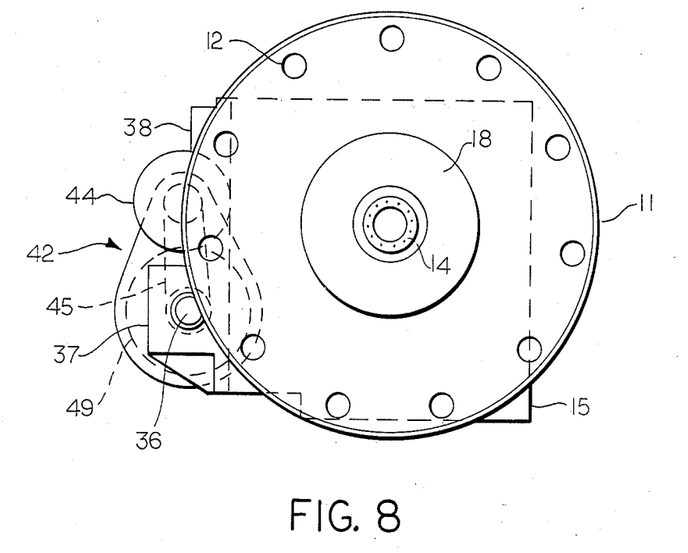
FIG. 8 is a plan view of the press table pedestal of FIG. 7 with the press superstructure removed.

The above press station functions are performed at the several stations simultaneously in the five second tool function interval between each table index. Generally known apparatus are utilized to perform these functions and are located above and/or radially displaced from the stations as shown in FIGS. 6 and 7. At gob loading station #1 a forehearth 57 from a glass tank (not shown) extends to a feeder (not shown) adapted to issue from bowl 56 gobs of the appropriate amount and in suitable thermal condition for forming faceplates. A gob deflector 58 and cullet chute 59 are associated with station #1 for selective actuation where glass pull is continued while the press is not operating. A press stand 61 having a ram 62 is mounted on a cross head 63 from central column 14 and outboard legs 64. The ram carries the male mold part (not shown) for pressing faceplates into the female mold at station #2. Support pins (not shown) are raised to support the table 11 at its underside adjacent the mold adapter in station #2 to avoid displacement of the table and mold by the press during the pressing operation. Wind headers apply cooling air to the upper surface of table 11 at stations #3, #4, #6 and #9 with the headers 65 at #3 and #4 on elevating mechanisms arranged through the timer control to lower the headers after the table is indexed and to raise the headers before the next index whereby interference with the mold shells is avoided. Cooling wind headers 66 at stations #6 and #9 can be stationary. Each of the cooling wind headers is provided with dampers (not shown) which inhibits the flow of air during table indexing and opens for air flow during each tool interval.

Shell transfer assembly 67 comprises an arm 68 oscillatable around central column 14 and carrying at its end a lift assembly 69 operating a lift rod 71 carrying a shell grip 72 for engaging and lifting the shell free of the partially cooled pressed faceplate and its supporting mold adapter. The tooling function at station #5 involves lowering a shell grip 72 to engage the shell, raising the grip and shell, oscillating the arm to a position above station #11 while it maintains the shell and grip in their raised position to clear the table and articles thereon. The grip and shell are lowered to station #11 during this cycle to deposit the shell at station #11 for advancement to the gob delivery at station #1.

The ware takeout 73 at station #10 may be a reciprocable carriage 74 driven radially of the press by a cylinder 75 and traveling on radial rails 76 extending from above a conveyor 77 to central column 14 to pass the carriage above the mold adapter at station #10. Takeout carriage 74 supports an elevator 78 for a pick-up suction cup 79 which is lowered into contact with the inner face of the faceplate indexed to station #10. Vacuum is applied to the suction cup 79 and it is raised clear of the mold adapter, and moved to a position above the conveyor where the panel is deposited by lowering the suction cup and releasing the vacuum.

Each of the tool functions requires accurate indexing of table 11 and the elements it supports. Particular accuracy is required for pressing to insure uniform relationships between the ram advanced male mold and the female mold elements, the mold adapter and mold shell, so that the walls of the faceplate are formed with consistent thicknesses. The molten glass should be under machine control in the tooling stations a maximum amount of time in the forming cycle while the transfer or indexing time should be minimized. However, in view of the fluid state of the glass and the optical quality required in the ultimate product, the transfer or indexing should be accomplished with precision within tolerable stresses during the minimized transfer time. The positive control of the indexing transfer motion by means of a barrel cam drive has resulted in a significant improvement as to transfer time and glass consistency by virtue of control of acceleration velocity and displacement of the table and the molten glass it supports.

It is to be appreciated that different arrangements for pressing cathode ray tube faceplates or other large pieces of glass were on a rotary press table can be utilized and improved results can be achieved where indexing of the table is by means of a rotary barrel cam and the indexing controls cooperating therewith. The number of press stations, the details of press tools and tool operations, the speed of operation can all be varied without departing from the spirit or scope of this invention.

What is claimed is:

1. Apparatus for pressing cathode ray tube faceplates comprising a circular table mounted for rotation about a central axis normal to said table; a plurality of mold stations positioned in a circular array centered on said axis and equally spaced around said table; a first mold part at each mold station carried by said table; a mating mold adapted to cooperate with said first mold part; a pressing ram mounting said mating mold at a press station to press charges of molten glass between said first mold parts and said mating mold; a hub secured to said table concentric with said axis; a plurality of cam followers mounted on said hub and extending radially therefrom; a barrel cam engaged with said followers to drive said table in rotation, said cam having a rib having side walls engaged by adjacent followers on opposed side wall portions of said rib, and said rib having a dwell section and a drive section, said dwell section of said rib extending along a substantial portion of the circumference of said barrel cam to maintain said table stationary and a mold station on said table at said press station throughout an arc of rotation while adjacent cam followers engage opposite sides of said rib at said dwell section; and drive means to rotate said barrel cam.

2. Apparatus according to claim 1 including means to stop rotation of said barrel cam with cam engaged followers on the dwell section of said rib; and means to accelerate said barrel cam from a stop with cam engaged followers on the dwell section of said rib.

3. Apparatus according to claim 2 including means to rotate said barrel cam at an essentially constant speed with cam engaged followers on the driving section of said rib.

4. Apparatus according to claim 1 wherein said drive means includes an input shaft; means driving said input shaft in rotation; a clutch to couple said input shaft to said barrel cam; and a brake for said barrel cam.

5. Apparatus according to claim 4 including a control for said brake to stop said barrel cam with cam engaged followers on the dwell section of said rib; and a control for said clutch to decouple said input shaft from said barrel cam when said brake is engaged.

6. Apparatus according to claim 5 including a flywheel on said input shaft and wherein said control for clutch decoupling and said control for the brake application are actuated at a cam rotational position in which the cam engaged followers are on the driving section of said rib.

7. Apparatus according to claim 4 wherein said drive means includes a worm wheel secured to said barrel cam and a worm driving said worm wheel and wherein said clutch couples said input shaft to said worm.

8. Apparatus according to claim 3 wherein said cam has a cycle of one revolution; the driving section of said cam extends around about three hundred degrees of said cam; and said dwell section of said cam extends around the balance of said cam.

9. Apparatus according to claim 8 wherein the driving section of said cam is formed to provide an acceleration which is generally a symmetrical sine wave of driven unit rotary advance per unit of cam rotation vs. unit of cam rotation with the peak of acceleration at about the one eighth point of the drive portion of said cam cycle and the peak of deceleration at about the seventh eighths point of the drive portion of said cam cycle.

10. Apparatus according to claim 8 wherein said drive means includes means driving an input shaft in rotation, a clutch to couple said input shaft to said barrel cam, a brake for said barrel cam and controls for said clutch and brake to decouple said clutch and apply said brake to stop said cam with said followers engaged at the center of said dwell section.

11. Apparatus according to claim 4 including a flywheel on said input shaft; and controls for said brake and clutch for stopping said barrel cam with said followers engaged at the center of said dwell section.

12. Apparatus according to claim 1 wherein said barrel cam has a rib with faces on each side of said rib and said cam followers are mounted on said hub to engage the rib faces on each side of said cam whereby said cam rotational position precisely controls said table rotational position, said rib defining said dwell section and said drive section and said dwell section being engaged by a pair of followers when said table aligns a mold station with said press station.

13. In the method of pressing cathode ray tube faceplates comprising introducing a gob of glass to a first mold positioned on a rotary table; advancing the gob along an arcuate path by indexing said table in increments around a central axis of rotation; pressing the gob in said mold by means of a stationary ram carrying a complementary mold which is advanced into the first mold; the improvement comprising: indexing the table, first mold and gob by means of a double lead barrel cam; rotating the cam at essentially constant speed during the indexing; and starting and stopping rotation of the cam during a dwell on said cam to position a mold on the table at the press station and maintain the table stationary while the dwell on the cam is within its range of drive control of the table.

14. In the method of claim 13 the step of forming said cam with a driving section producing a symetrical indexing acceleration vs. cam displacement relationship which approaches a sine wave with peaks skewed toward the initial and terminal portions of the indexing.

15. In the method of claim 13 wherein an indexing cycle is accomplished in one revolution of the cam and the dwell is effective over about one fifth a revolution of the cam; the step of stopping the cam rotation in essentially the center of the cam dwell.

16. In the method of claim 15 the step of actuating the stopping of cam rotation prior to the advance of the cam to a position in which its dwell is effective.

17. In the method of claim 13 the step of maintaining positive control of the index motion of the table by engagement of both sides of a cam rib with cam followers.

* * * * *